Feb. 25, 1941.　　　　G. T. LEWIS ET AL　　　　2,233,318
TRACTOR
Filed Dec. 20, 1939　　　5 Sheets-Sheet 1

Inventors
George T. Lewis &
William C. Rivers
By Philip A. H. Terrell
Atty.

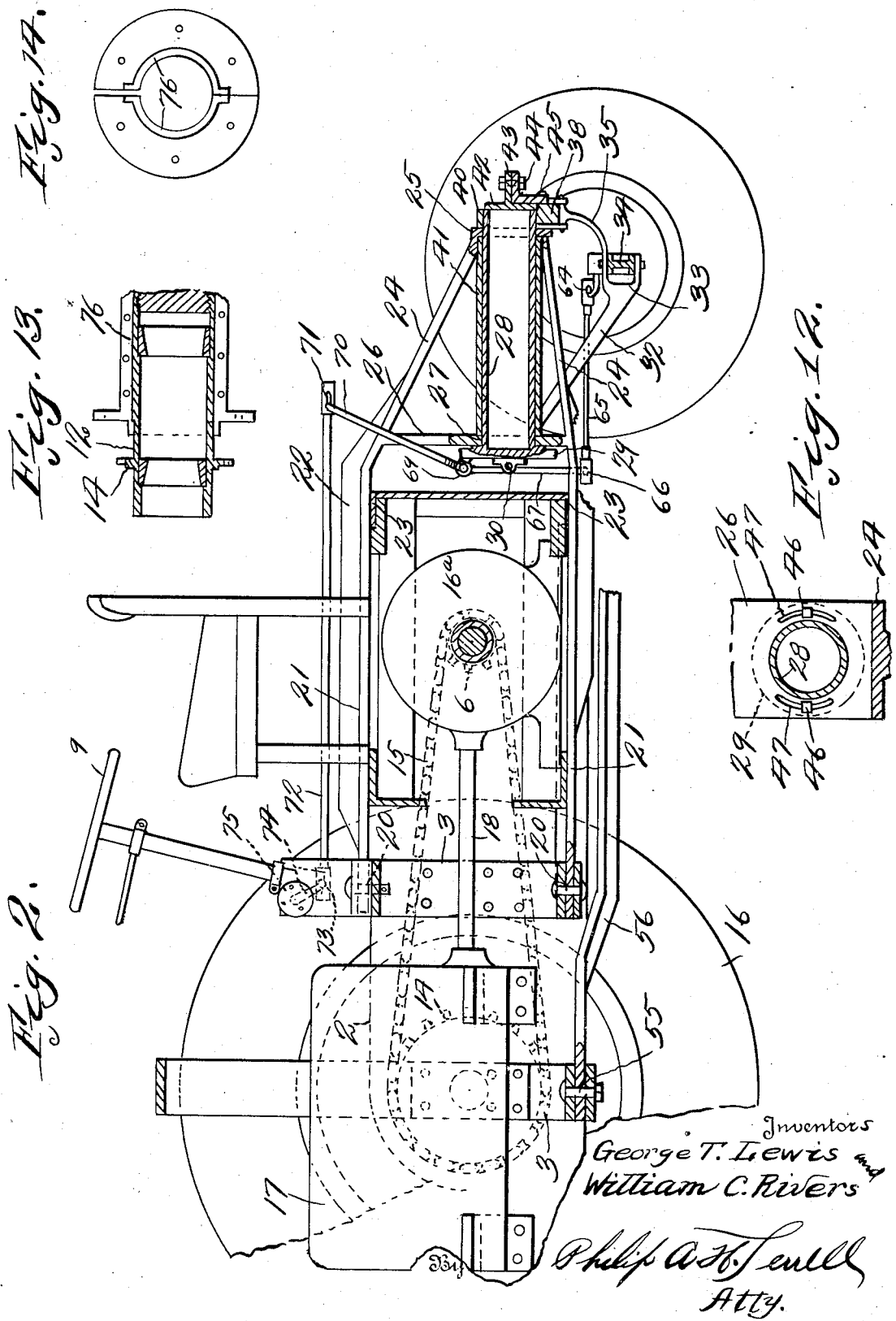

Feb. 25, 1941.    G. T. LEWIS ET AL    2,233,318
TRACTOR
Filed Dec. 20, 1939    5 Sheets-Sheet 3

Inventors
George T. Lewis and
William C. Rivers
By Philip A. H. Terrell
Atty.

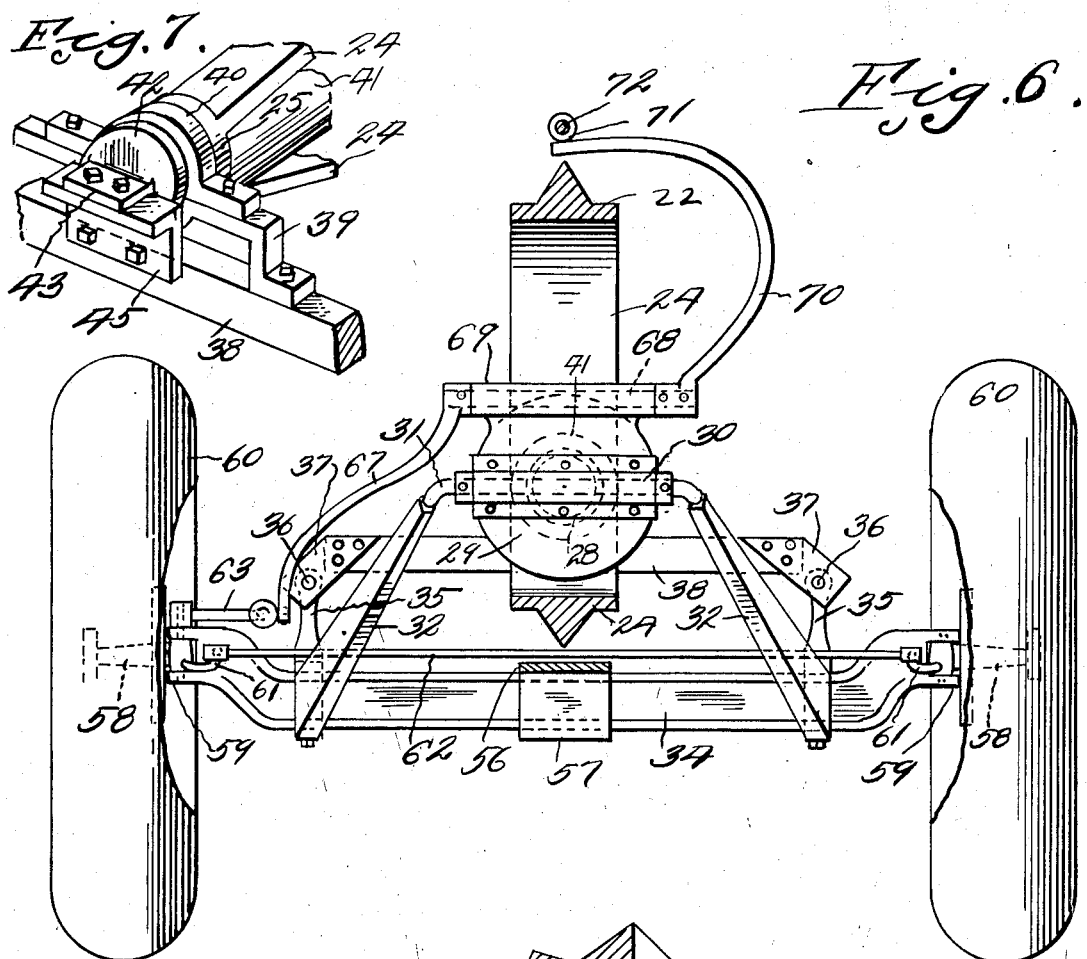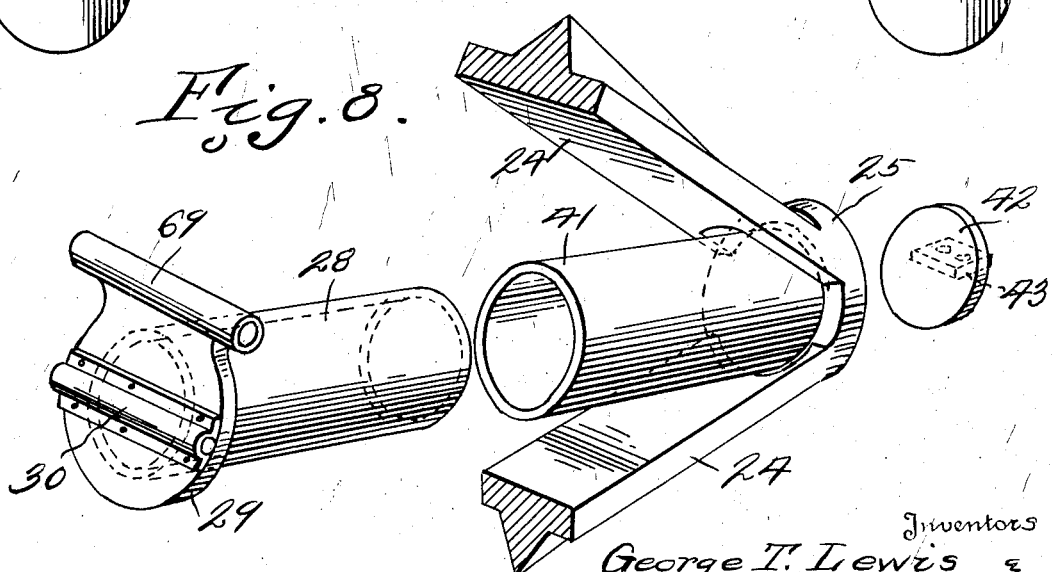

Feb. 25, 1941.                G. T. LEWIS ET AL                    2,233,318
                                    TRACTOR
                           Filed Dec. 20, 1939        5 Sheets-Sheet 5
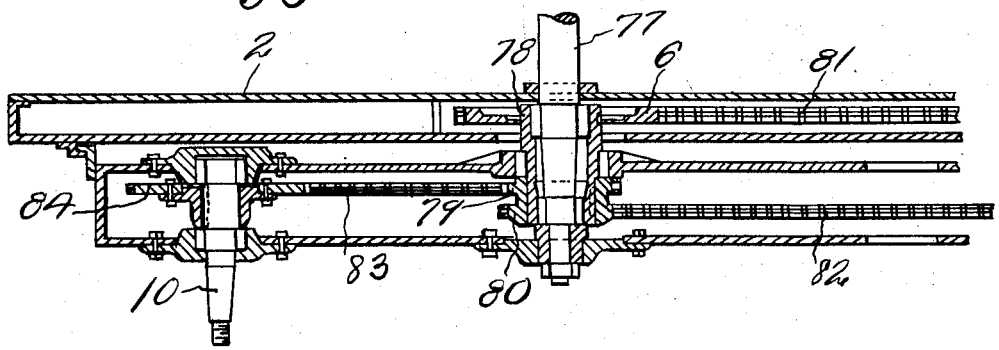
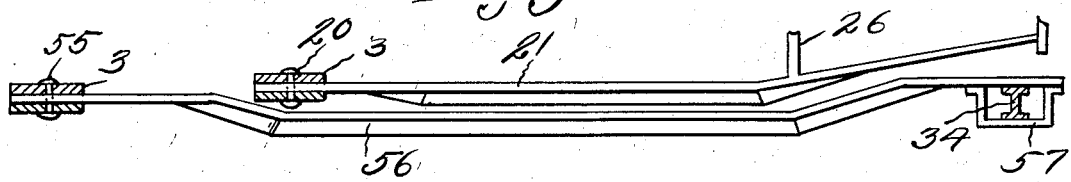
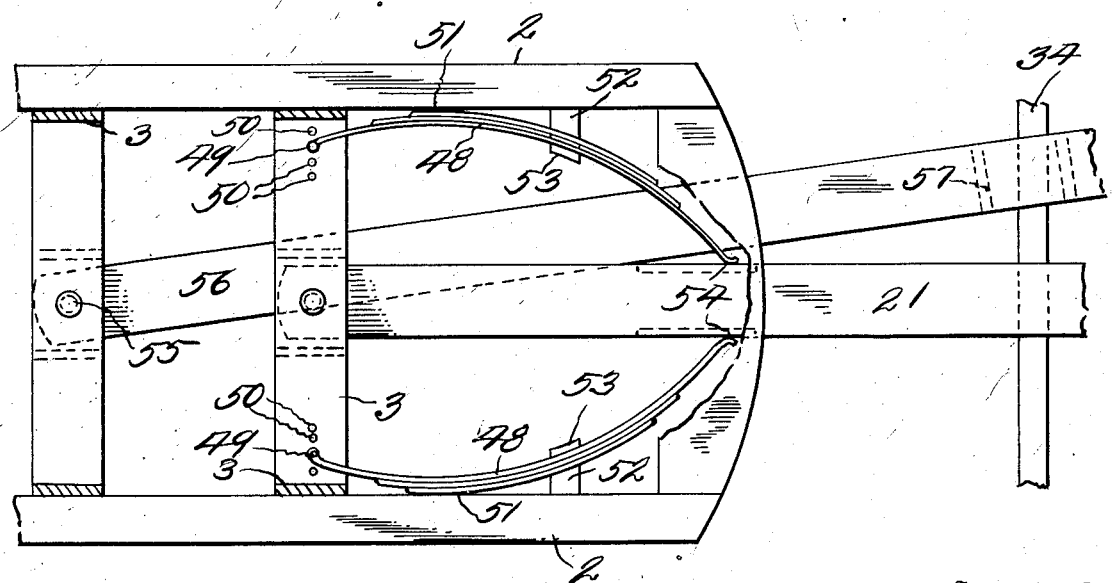
Inventors
George T. Lewis
William C. Rivers
By Philip A. H. Terrell
Atty.

Patented Feb. 25, 1941

2,233,318

UNITED STATES PATENT OFFICE 2,233,318

TRACTOR

George T. Lewis and William C. Rivers, Jacksonville, Fla.

Application December 20, 1939, Serial No. 310,144

8 Claims. (Cl. 180—1)

The invention relates to tractors, and has for its object to provide a device of this character wherein large front wheels are driven so the tractor will easily climb out of ditches and depressions, incident to the larger front driven wheels.

A further object is to provide a pivoted frame movable in a horizontal plane and pivoted to the main frame, and extending rearwardly and having rockably connected thereto for movement in a vertical transverse plane the rear axle structure carrying the rear wheels, thereby allowing the rear wheels to uniformly carry the load when the front and rear wheels rest on the ground in planes at angles to each other.

A further object is to provide means for limiting the pivotal movement in a vertical transverse plane of the rear axle structure.

A further object is to provide steering means for the rear wheels controllable from the operator's seat on the main frame.

A further object is to provide the rear end of the pivoted frame with horizontally disposed sleeve, in which is rockably mounted a bearing member carried by the rockable axle structure.

A further object is to provide an implement draw bar pivotally connected to the main frame beneath the axis of the front wheels and extending rearwardly beyond the rear axle, thereby placing the draft below the axis of the wheels and increasing draw bar pull and decreasing strain on the rear end of the tractor, and preventing the front end of the tractor from rearing upwardly and turning over on the operator, which is a common difficulty in tractors as at present constructed.

A further object is to drive the large forward wheels through differential mechanism and to provide brake means at opposite sides of the differential mechanism for allowing the braking of either wheel so the tractor can be turned around on one of the large front wheels as a pivotal point, thereby allowing the turning of the tractor within a minimum amount of space, for instance at the ends of rows during a plowing operation; also at the ends of stretches of road during road grading operation.

A further object is to provide stub axle steering means on the rear axle structure and rockable therewith, and a longitudinally movable steering link between the stub axle steering means and a steering mechanism, said link being positioned on the vertical longitudinal center of the pivoted frame, and connected to the steering wheel mechanism pivotally in registry with the pivotal connection between the rearwardly extending pivoted frame and the main frame.

A further object is to provide a rear axle and wheels on the tractor, connected to the main frame, equipped with steering mechanism, which rear axle and wheels may be substituted for the front axle and wheels of an implement to be drawn by the tractor, thereby making for greater efficiency in operation of the tractor when used to draw working implements by reducing the overall length of the combined unit.

A further object is to provide a two wheeled power tractor which may be connected by draw bar and pin to the front axle and wheels of an implement, such as a road scraper.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 2 is a vertical longitudinal sectional view through the tractor.

Figure 6 is a vertical transverse sectional view taken on line 6—6 of Figure 1.

Figure 7 is a detail perspective view of the rear end of the rock bearing for the rear axle structure.

Figure 8 is a collective view of parts of the rocker bearing.

Figure 9 is a plan view of the spring means for normally centering the pivoted rear axle carrying frame.

Figure 10 is a view in side elevation of the draw bar and a portion of the pivoted frame.

Figure 11 is a modified form of front wheel drive mechanism showing the same in horizontal section.

Figure 12 is a vertical transverse sectional view through the forward end of the rocker bearing and a portion of the pivoted frame, showing the limiting means for limiting the rocking action of the rear axle structure.

Figure 13 is a horizontal sectional view through a hub adapted to be used when it is desired to vary the tread width.

Figure 14 is an end view of the bearing shown in Figure 13.

Figure 1:
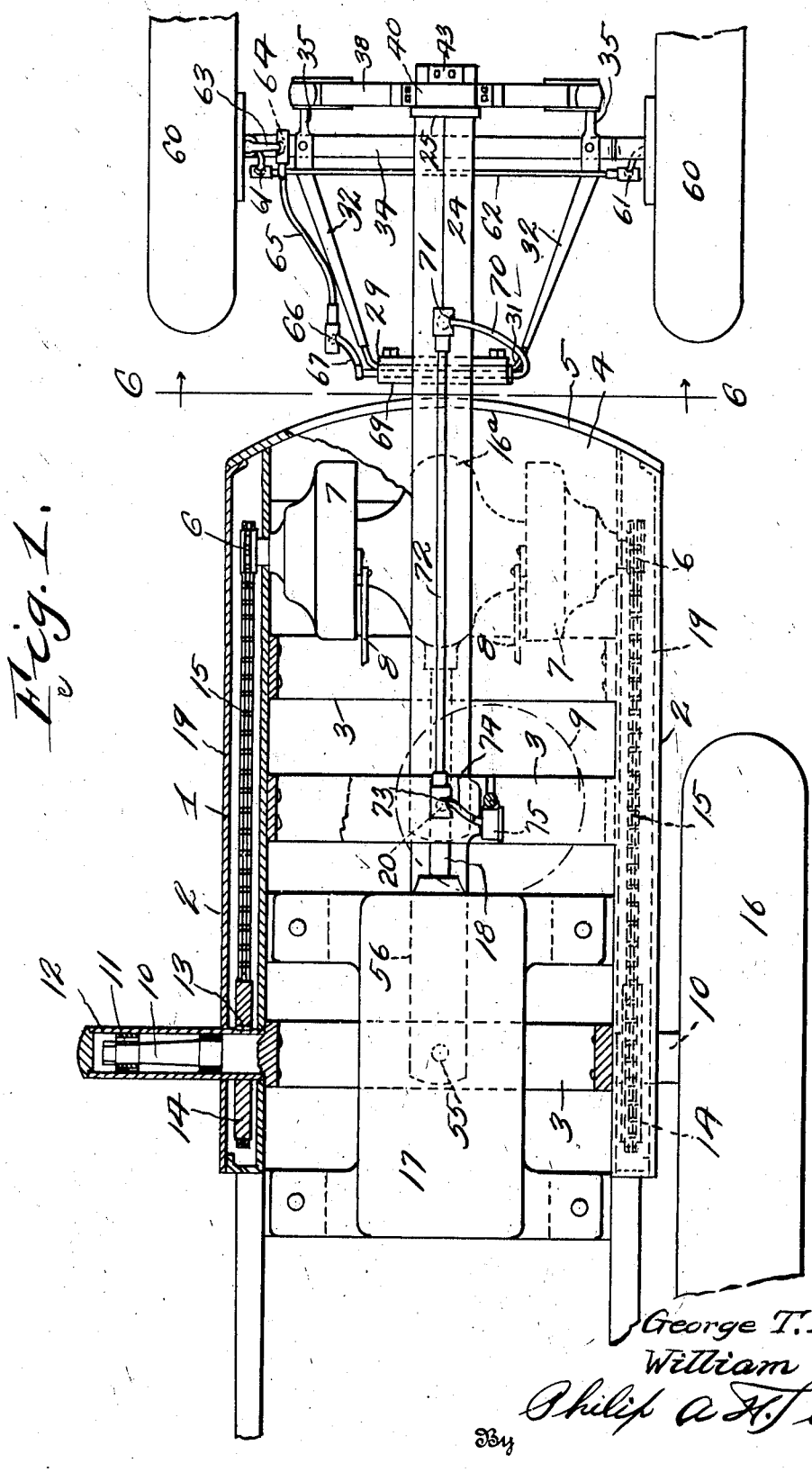
Figure 1 is a top plan view of the tractor, parts of the main frame being broken away to better show the drive mechanism.
Figure 4:
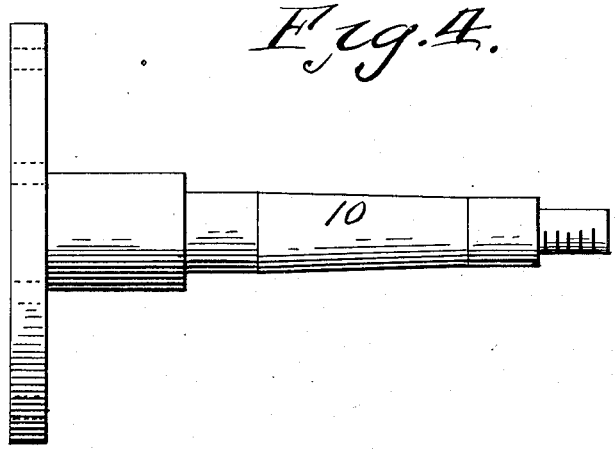
Figure 4 is an enlarged side elevation of one of the stationary spindles for the front wheels.
Figure 5:
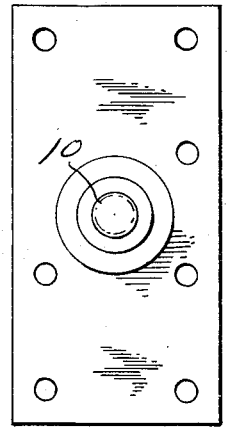
Figure 5 is a view in elevation of one of the spindles.
Figure 3:
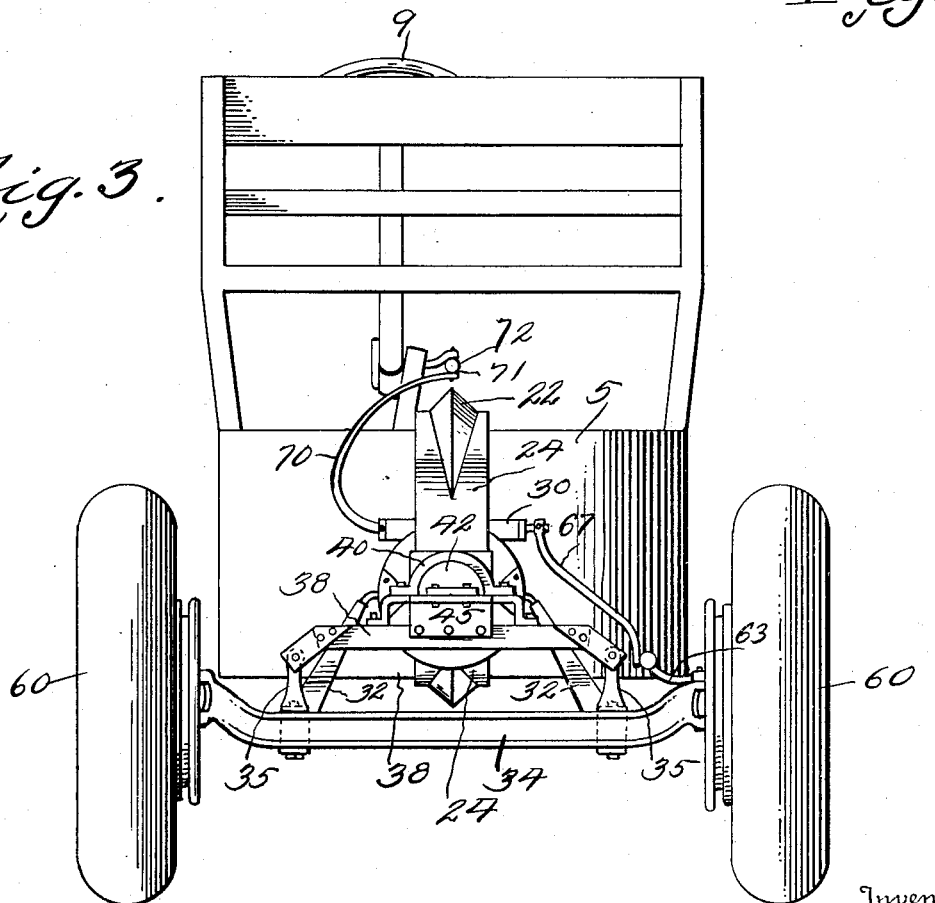
Figure 3 is a rear elevation of the tractor.

Referring to the drawings, the numeral 1 designates the frame of the tractor, which frame comprises chambered side members 2 connected together by spaced transverse frames 3 and a chambered rear end 4 having a removable cover plate 5. Disposed within the chambered portion 4 is a conventional form of differential mechanism which drives the sprockets 6 through brake mechanism 7 of conventional construction. The brake mechanisms 7 are controlled by means of brake rod 8 which may lead to any suitable source of control adjacent the steering wheel 9. Secured to the forward frame 3, at opposite sides thereof, are stationary spindles 10 on which are rotatably mounted, through the medium of anti frictional bearing 11, wheel carried sleeves 12, which sleeves extend into the chambered side members 2 of the frame 1 and have keyed thereto, at 13, sprockets 14. The particular types of spindles may be varied if desired and the ones shown are for purposes of illustration only.

Endless drive chains 15 extend over the sprockets 6 and 14 for driving the large front wheels 16, and it will be seen by controlling the brake mechanism 7, either wheel can be held against rotation and the other wheel driven so that the tractor can be turned around in a relatively small area.

Mounted on brackets between the chambered side members 2 of the tractor frame is a conventional form of engine 17, which engine is provided with a drive shaft 18, which in turn drives the differential mechanism 16a. The chambered side members 1 are preferably provided with removable side plates 19, which when removed allow ready access to the drive chain structure and if desired the chambered members 2 may be filled with lubricant for lubricating the drive chain connections.

Pivotally connected at 20 to one of the spaced frames 3 in a plane on the vertical longitudinal center of the main frame 1 are the rearwardly extending arms 21 of the rear axle carrying frame 22. It will be noted that the arms 21 are above and below the rear portion of the frame 1, and have a bearing thereon, on a detachable wear plate 23 for bracing the frame. The rear ends of the arms 21 terminate in converging members 24, which portions 24 are connected together by a bearing collar 25. The portions 24 adjacent their forward ends are connected together by means of a transversely disposed plate 26 in a bearing 27 of which an inner rock cylinder 28 is mounted. The forward end of the rock cylinder 28 is provided with a plate 29 having a bearing sleeve 30 extending across its axis and in which is rockably mounted the transverse portion 31 of downwardly and rearwardly diverging axle carrying arms 32.

The arms 32 are provided with bifurcations 33, in which is secured the rear axle 34. One of the arms of the bifurcations curve rearwardly and upwardly and is designated by the numerals 35, and are in turn connected at 36 between plates 37 carried by the ends of the bolster 38, which bolster is provided with a bracket 39 forming a part of a split collar 40 extending around the rear end of the rock bearing 28. It will be seen that when the axle 34 rocks in a vertical transverse plane the cylinder or bearing member 28 will rock within the bearings 27, sleeve 41, bearing collar 25 and split collar 40, therefore, it will be seen that a flexible rear axle structure is provided, which will allow both wheels to rest on the ground in a plane at an angle to the plane of the axis of the front wheels 16, and by providing the large front wheels 16 and driving said front wheels, the rear wheels may be easily pulled out of a ditch or rut.

The rear end of the bearing member 28 is closed by a plate 42 having an outwardly extending flange 43 bolted at 44 to an angle member 45, in turn secured to the bolster 38.

It has been found desirable to limit the movement of the rear axle structure in a vertical transverse plane and to accomplish this result the plate 29 is provided with headed stop bolts 46 which extend through arcuate slots 47 in the plate 26, and when either of these bolts reaches the ends of the slots 27, the rocking action is stopped.

The frame formed by the arms 21 is normally forced to a position on the longitudinal center of the tractor by means of semi elliptic springs 48 having one of their ends pinned at 49 to one of the frame members 3, clearly shown in Figure 9, and the frame 3 is provided with a plurality of apertures 50 so the tension of the springs can be varied. Springs 48 have bearings at 51 against the chambered side members 2 and extend over supporting brackets 52 having upstanding arms 43 and terminate in sliding engagement at 54 with opposite sides of the lower arm 21, therefore it will be seen that during a turning operation the draft frame 22 may swing against the action of either of said springs but upon straightening out the tendency will be to return the frame to the longitudinal center of the tractor.

Pivotally connected at 55 to the lower portion of the forward frame 3 is a rearwardly extending implement draft bar 56. The draft bar is pivoted on the longitudinal center of the tractor and extends rearwardly below the frame 22 and has a sliding yoke connection 57 with the axle 34. Any kind of clevis may be formed on the rear end of the implement draft bar 56. It will be noted that the pivotal point 55 of the draft bar 56 is below the axis of the large front wheels of the tractor, therefore it will be seen that upon excessive load the draft strain will be in an underslung position. The draft bar need not be attached when not needed for use.

Mounted on stub axle spindles 58, pivotally mounted in forks on the ends of the rear axle 34, are the small rear ground engaging wheels 60. The spindles 58 are provided with forwardly extending arms 61 which are connected together by connecting rod 62 so that both wheels will be simultaneously moved in the same direction when the steering arm 63 is moved. Pivotally connected at 64 to the steering arm 63 is a forwardly extending connecting rod 65, the forward end of which is pivotally connected at 66 to an outwardly and downwardly curved arm 67 carried by a rock shaft 68, in turn rockably mounted in a transverse sleeve 69 carried by the plate 29. Connected to the other end of the rock shaft 68 is an outwardly, upwardly and inwardly extending lever 70. Connected to the end of the lever 70 pivotally at 71 in a plane on the vertical longitudinal center of the tractor is a forwardly extending connecting rod 72 which extends forwardly and terminates in a ball and socket connection 73 to the movable steering arm 74, which is also on the vertical longitudinal center of the tractor. The arm 74 is moved forwardly and rearwardly through a conventional form of gear connection within a gear casing 75 when the steering wheel 8 is rotated to either side for a steering operation. It will be noted that the connections 73 and 71 are on the longitudinal center of the tractor and that the rear end of the connecting rod 72 may move upwardly or downwardly, hence the rear wheel steering operation may be controlled, irrespective of the position of the rear axle 34 in a vertical transverse plane, and the parts will not bind and interfere with the rocking action of the rear structure.

It is to be understood the tractor may be used for any purposes and applicants do not limit themselves in this respect, however it is particularly adapted for road grading operations, fire line forestry work and agricultural purposes if desired.

Referring to Figures 13 and 14, in these figures a split hub is provided comprising segmental sections 76 which are adapted to be clamped on the hub section 13 where it is desired to place a wheel 16 having a wider tread or wheel base which is often desirable where the tractor is used for agricultural purposes.

Referring to Figure 11 an alternate detachable tandem drive is shown for use with certain types of implements for instance road graders, and adapted to be substituted for the structure shown in Figure 1 for driving the wheels 16.

In this form of drive the shaft 77 is driven from the differential 16a and rotates the sprocket 6 and the sprockets 79 and 80 carried by the driven sleeve 78. Sprocket chains 81 and 82 lead from sprockets 6 and 80 and a third sprocket chain 83 drives the sprocket 84 through the medium of the chain connection, consequently drives the spindle 10.

Although the member 28 has been shown as inside the member 41 for forming the rocking bearing for the rear running gear, it is to be understood the part 28 may be placed on the outside if desired.

From the above it will be seen that a tractor is provided wherein front large wheels are driven and the tractor steered from the rear small wheels, thereby allowing the front driven wheels to easily pull the rear wheels over obstructions. It will also be seen that the rear axle structure and wheels have a pivotal movement in a vertical transverse plane and the wheels are of the stub spindle type, and said spindles and wheels are controlled through steering link connections to the main frame adjacent the front drive wheels.

The invention having been set forth what is claimed as new and useful is:

1. The combination with a tractor having rear steering wheels pivotally mounted on the ends of an axle, of a rockably mounted running gear rockable in a vertical transverse plane, said running gear being carried by the rearwardly extending pivoted frame movable in a horizontal plane, of means for pivotally moving said steering wheels, said means comprising a plate carried by the rockable running gear and rockable therewith, a bearing carried by said plate, bracket connections between said plate and the axle for rocking the bearing plate, of means for steering said wheels from the frame of the tractor, said means comprising a transverse bearing carried by the plate, a shaft rockably mounted in said bearing, one end of said shaft having an upwardly extending arm arching one side of the frame and terminating above the frame, a steering arm mounted on the main frame, a link connection between said steering arm and upwardly extending arm, a downwardly extending arm carried by the other end of the shaft rockably mounted in the sleeve and link connections between said last named arm and one of the wheels.

2. A device as set forth in claim 1 wherein the link connection between the steering arm and the upwardly extending arm is on the longitudinal center of the pivoted frame in a vertical plane and movable with the pivoted frame.

3. The combination with a front driven tractor having wheels carried by a main frame, of a floating rear running gear structure, said structure comprising a pivoted frame pivotally connected to the main frame, said pivoted frame having arms disposed above and below the main frame, a horizontally disposed elongated bearing member carried by the rear end of the pivoted frame, a rockable bearing member within the first mentioned bearing member, an axle carried by said running gear, brackets connecting the forward end of the rockable bearing and said axle, brackets connecting said axle and the rear end of the rockable bearing member, stops carried by the rockable bearing member and cooperating with slots in the bearing member of the pivoted frame for limiting the rocking action of the rockable bearing, said pivoted frame having a bearing ring at its rear end in which the rockable bearing is mounted.

4. The combination with a front driven tractor having wheels carried by a main frame, of a floating rear running gear structure, said structure comprising a pivoted frame pivotally connected to the main frame, said pivoted frame having arms disposed above and below the main frame, a horizontally disposed elongated bearing member carried by the rear end of the pivoted frame, a rockable bearing member within the first mentioned bearing member, an axle carried by said running gear, brackets connecting the forward end of the rockable bearing and said axle, brackets connecting said axle and the rear end of the rockable bearing member, a plate carried by the forward end of the rockable bearing, limit stops carried by the plate and a portion of the pivoted frame for limiting the rocking action of the rockable bearing, said axle brackets having a transverse connecting portion extending through a transverse aperture in the plate for rocking the rockable bearing, said running gear having stub spindles for its wheels and means for controlling said spindles from the main frame.

5. The combination with a front driven tractor comprising a frame having large front wheels and driven from power mounted on the frame, of a pivoted rearwardly extending frame carried by the first mentioned frame and terminating to the rear of the first mentioned frame, a rear running gear comprising an axle and wheels, a horizontally disposed rocker bearing connection between the rear end of the pivoted frame and the rear running gear, said wheels of the rear running gear being pivotally mounted for rear steering purposes, steering connections between the steering mechanism mounted on the first mentioned frame and the rear wheels, said steering connections comprising a steering arm movable in a vertical longitudinal plane on the center of the first mentioned frame, a link connection between the steering arm and an arm carried by a rock sleeve rockable with the rockable bearing connection and a link connection between said last named arm and one of the steering wheels, and connecting rod means connecting the wheels whereby they will be simultaneously moved.

6. The combination with a front driven tractor comprising a main frame having front wheels and driven from power mounted on the main frame, of a pivoted rearwardly extending frame carried by the main frame and terminating to the rear of the main frame, a rear running gear comprising an axle and wheels, a horizontally disposed rocker bearing connection between the rear end of the pivoted frame and the running gear, said wheels of the rear running gear being pivotally mounted for rear steering purposes, steering connections between the steering mechanism mounted on the main frame and the rear wheels, an implement draw bar pivoted to the main frame forwardly of the pivotal point of the pivoted frame and extending rearwardly, said draw bar having a yoke connection to the axle of the rear running gear.

7. A device as set forth in claim 4 wherein the pivoted frame comprises arms disposed above and below the main frame and the portion of the pivoted frame for limiting the rocking action comprises a vertically and transversely disposed brace member connecting the arms of the pivoted frame to the rear of the main frame.

8. A device as set forth in claim 4 wherein the pivoted frame comprises arms engaging the upper and lower sides of the main frame, said arms converging towards each other to the rear end of the rock bearing.

GEORGE T. LEWIS.
WILLIAM C. RIVERS.